United States Patent
Lee

(10) Patent No.: US 12,521,974 B2
(45) Date of Patent: Jan. 13, 2026

(54) ECO-FRIENDLY SEMI-NONCOMBUSTIBLE EXTERIOR MATERIAL AND METHOD FOR MANUFACTURING SAME

(71) Applicant: SEOHAN ANTAMINE CO., LTD., Incheon (KR)

(72) Inventor: Kyun Kil Lee, Incheon (KR)

(73) Assignee: SEOHAN ANTAMINE CO., LTD., Incheon (KR)

( * ) Notice: Subject to any disclaimer, the term of this patent is extended or adjusted under 35 U.S.C. 154(b) by 183 days.

(21) Appl. No.: 18/035,422

(22) PCT Filed: Jul. 16, 2021

(86) PCT No.: PCT/KR2021/009198
§ 371 (c)(1),
(2) Date: Jul. 21, 2023

(87) PCT Pub. No.: WO2022/097878
PCT Pub. Date: May 12, 2022

(65) Prior Publication Data
US 2023/0405985 A1    Dec. 21, 2023

(30) Foreign Application Priority Data
Nov. 4, 2020 (KR) .......................... 10-2020-014862

(51) Int. Cl.
*B32B 29/02* (2006.01)
*B32B 5/02* (2006.01)
(Continued)

(52) U.S. Cl.
CPC .............. *B32B 29/02* (2013.01); *B32B 5/022* (2013.01); *B32B 27/10* (2013.01); *B32B 27/18* (2013.01);
(Continued)

(58) Field of Classification Search
CPC ....... B32B 29/02; B32B 29/005; B32B 29/06; B32B 5/249; B32B 5/244; B32B 5/022;
(Continued)

(56) References Cited

U.S. PATENT DOCUMENTS

| | | | | |
|---|---|---|---|---|
| 3,841,956 A | * | 10/1974 | Palazzolo et al. .... | B44C 5/0469 156/308.2 |
| 2003/0113520 A1 | * | 6/2003 | Takahashi .............. | D21H 27/28 428/201 |
| 2010/0015389 A1 | | 1/2010 | Zhang et al. | |

FOREIGN PATENT DOCUMENTS

| | | |
|---|---|---|
| KR | 10-0910741 B1 | 8/2009 |
| KR | 10-2012-0128945 A | 11/2012 |

(Continued)

OTHER PUBLICATIONS

International Search Report for PCT/KR2021/009198 dated Nov. 11, 2021.

*Primary Examiner* — Catherine A. Simone
(74) *Attorney, Agent, or Firm* — Sughrue Mion, PLLC

(57) ABSTRACT

One aspect of the present specification provides an eco-friendly semi-noncombustible exterior material including: a core part (10) formed by impregnating a paper or fabric base with a triazole-modified phenolic resin; an outer skin (20) formed by impregnating a paper substrate with a melamine resin and joined to at least one surface of the core part; and a UV film (30) formed on at least one surface of the outer skin, and containing a polymethyl methacrylate resin.

5 Claims, 1 Drawing Sheet

(51) Int. Cl.
- *B32B 27/10* (2006.01)
- *B32B 27/18* (2006.01)
- *B32B 27/30* (2006.01)
- *B32B 29/00* (2006.01)
- *B32B 29/06* (2006.01)
- *B32B 37/18* (2006.01)
- *B32B 38/08* (2006.01)
- *C08J 5/12* (2006.01)
- *C08J 5/24* (2006.01)
- *C08K 3/22* (2006.01)
- *C08K 5/00* (2006.01)
- *C08L 61/14* (2006.01)
- *E04B 1/94* (2006.01)

(52) U.S. Cl.
CPC .......... *B32B 27/308* (2013.01); *B32B 29/005* (2013.01); *B32B 29/06* (2013.01); *B32B 37/182* (2013.01); *B32B 38/08* (2013.01); *C08J 5/121* (2013.01); *C08J 5/244* (2021.05); *C08J 5/249* (2021.05); *C08K 3/22* (2013.01); *C08K 5/005* (2013.01); *C08L 61/14* (2013.01); *E04B 1/942* (2013.01); *B32B 2250/05* (2013.01); *B32B 2260/021* (2013.01); *B32B 2260/028* (2013.01); *B32B 2260/046* (2013.01); *B32B 2262/101* (2013.01); *B32B 2305/076* (2013.01); *B32B 2305/18* (2013.01); *B32B 2307/3065* (2013.01); *B32B 2307/4026* (2013.01); *B32B 2307/7376* (2023.05); *B32B 2315/085* (2013.01); *B32B 2317/125* (2013.01); *B32B 2333/12* (2013.01); *B32B 2419/00* (2013.01); *C08J 2333/12* (2013.01); *C08J 2361/10* (2013.01); *C08J 2379/02* (2013.01); *C08K 2003/2227* (2013.01)

(58) Field of Classification Search
CPC ....... B32B 27/10; B32B 27/18; B32B 27/308; B32B 2307/7376; B32B 2260/021; B32B 2260/028; B32B 2260/046; B32B 2262/101; B32B 2333/12; B32B 2419/00; E04B 1/942

See application file for complete search history.

(56) References Cited

FOREIGN PATENT DOCUMENTS

| | | |
|---|---|---|
| KR | 20-0471442 Y1 | 2/2014 |
| KR | 10-1706575 B1 | 2/2017 |
| KR | 10-2212582 B1 | 2/2021 |

\* cited by examiner

【FIG.1】
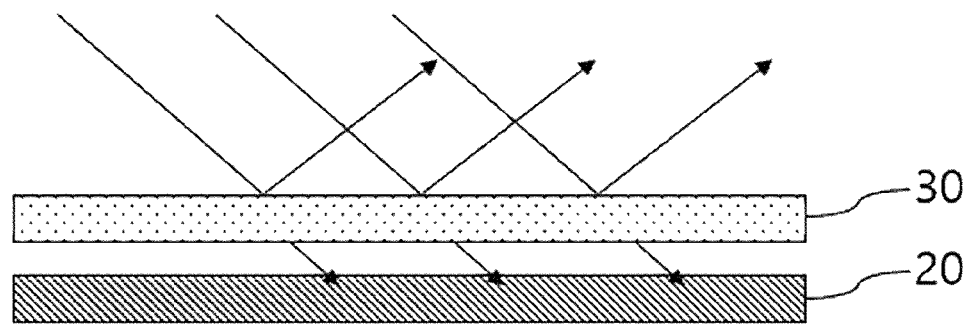
【FIG.2】
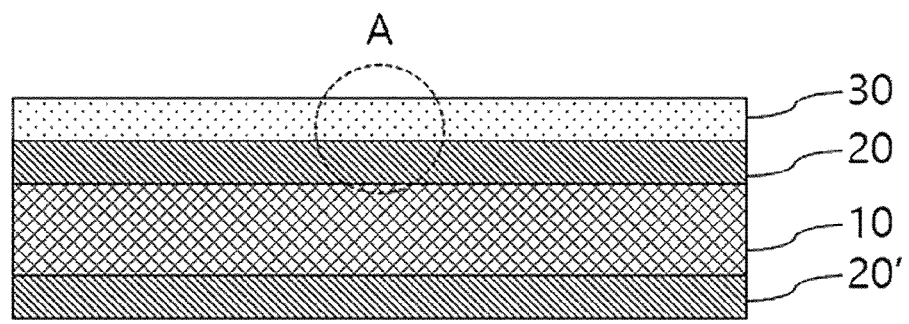

ECO-FRIENDLY SEMI-NONCOMBUSTIBLE EXTERIOR MATERIAL AND METHOD FOR MANUFACTURING SAME

CROSS REFERENCE TO RELATED APPLICATIONS

This application is a National Stage of International Application No. PCT/KR2021/009198 filed Jul. 16, 2021, claiming priority based on Korean Patent Application No. 10-2020-0145862 filed Nov. 4, 2020, the entire disclosures of which are incorporated herein by reference.

TECHNICAL FIELD

The present specification relates to an eco-friendly semi-noncombustible exterior material having excellent non-combustibility, flame retardancy and anti-yellowing performance and a method of manufacturing the same.

BACKGROUND ART

In general, the decorativeness of exterior materials installed on the outer walls of buildings is important for image improvement. Further, functionality such as durability, fire resistance, eco-friendliness, economic feasibility and workability is required. In particular, insulating materials are generally installed on the exterior of the building in order to maintain a constant temperature inside the building even when the outside temperature changes. The traditional insulation method is a method of inserting an insulating material between the inner wall and the outer wall, but this method has a disadvantage of increasing overall construction costs and lengthening the construction period because it is necessary to use a separate material for construction.

To address this issue, a dryvit method was proposed and widely used. The dryvit method is a concept of applying an adhesive directly to the outside of the building wall, allowing an insulation material to adhere thereon, and then applying a finishing material thereon to form a protective film. According to this method, construction costs are significantly reduced, and construction and exterior wall remodeling is easy compared to existing insulation construction. However, the outer wall formed by the dryvit method is very vulnerable to fire. This is a problem that can be solved by using a noncombustible material as the insulating material, but the reality is that inexpensive insulating materials such as Styrofoam have been used because cost savings, the biggest advantage of the dryvit method, are lost when expensive noncombustible materials are used.

Particularly, in the case of Korea, small and medium-sized officetels and one-room buildings, which are types of urban living housing, are densely built in downtown areas. The dryvit method has been widely used because builders need to build a building as quickly and cheaply as possible to create profitability. In the case of a fire, cheap insulating materials act as fire starters in the buildings built in this way, and the fire spreads rapidly and toxic gases are generated, leading to large-scale fires, resulting in human casualties. For example, the Uijeongbu apartment fire accident that occurred in 2015 and the Jecheon sports center fire accident that occurred in 2017 can be cited, both of which are large-scale fire accidents as the fire quickly spread along the outer wall of the building.

As such fire accidents occurred frequently, the amendment to the "Enforcement Decree of the Building Act", which strengthened fire safety standards for buildings, was implemented in earnest on Nov. 7, 2019. According to the amendment, the use of flammable exterior materials such as Styrofoam was completely banned in daycare centers, schools and hospitals, regardless of the height between floors or height. Also, in all buildings, including neighborhood living facilities, the use of flammable exterior materials is prohibited for buildings with three or more floors or a height of 9 m or more, and this applies to all materials constituting the outer walls.

Building materials are divided into noncombustible materials, semi-noncombustible materials, and flame retardant materials according to flame retardant performance. In the case of buildings with three or more floors and buildings used by children and the elderly, it is mandatory to use semi-noncombustible or noncombustible materials that do not burn for more than 10 minutes.

Therefore, there is a demand for the development of a semi-noncombustible exterior material, which satisfies the flame retardant performance according to the Building Act and has excellent weather resistance and aesthetics, and a method of manufacturing the same.

Technical Problem

The descriptions in the present specification are intended to solve the aforementioned problems of the related art, and an object thereof is to provide an eco-friendly semi-noncombustible exterior material which has excellent weather resistance and anti-yellowing performance and high aesthetics and decorativeness while having excellent flame retardancy and non-combustibility as a material for building finishing, and a method of manufacturing the same.

Technical Solution

An aspect of the present specification provides an eco-friendly semi-noncombustible exterior material including: a core part 10 formed by impregnating a paper or fabric substrate with a triazole-modified phenolic resin; a shell part 20 formed by impregnating a paper substrate with a melamine resin and bonded to at least one surface of the core part; and a UV film 30 formed on at least one surface of the shell part and containing a polymethyl methacrylate resin.

In an embodiment, the substrate of the core part may be fiberglass containing an inorganic flame retardant.

In an embodiment, the inorganic flame retardant may be one selected from the group consisting of calcium carbonate, silicon dioxide, aluminum hydroxide, magnesium oxide, aluminum oxide and a mixture of two or more thereof.

In an embodiment, the phenolic resin may include one selected from the group consisting of tetrabromobisphenol A, a triazole-modified phenolic resin, a triazine-modified phenolic resin and a mixture of two or more thereof.

In an embodiment, the melamine resin may further include a UV absorber, and the UV absorber may be one selected from the group consisting of a benzotriazole-based UV absorber, a triazine-based UV absorber and a mixture thereof.

In an embodiment, the substrate of the shell part may further include a pigment containing a UV stabilizer, and the UV stabilizer is one selected from the group consisting of a hydroxybenzophenone-based compound, a hindered amine-based compound, a salicylate-based compound, an oxanilide-based compound and a mixture of two or more thereof.

In an embodiment, the exterior material may have a thickness ranging from 8T to 10T.

Another aspect of the present specification provides a method of manufacturing an eco-friendly semi-noncombustible exterior material, which includes: (a) preparing a phenolic resin impregnating solution and a melamine resin impregnating solution by introducing a phenolic resin and a melamine resin into respective impregnation tanks; (b) preparing core impregnated paper by impregnating a paper or fabric substrate with the phenolic resin impregnating solution; (c) preparing shell impregnated paper by impregnating a paper substrate with the melamine resin impregnating solution; (d) forming a core part by laminating one or more sheets of the core impregnated paper; (e) forming a shell part by laminating one or more sheets of the shell impregnated paper, and bonding the shell part to at least one surface of the core part; and (f) forming a UV film containing a polymethyl methacrylate resin on at least one surface of the shell part.

In an embodiment, each impregnation tank may be filled with an inorganic flame retardant in Step (a), the substrate in Step (b) may be a fiberglass substrate, and the paper substrate in Step (c) may be pattern paper.

In an embodiment, the phenolic resin in Step (a) may be prepared by a method including: (i) synthesizing a phenolic resin in the presence of an acid catalyst; (ii) reacting the phenolic resin synthesized in Step (i) with propargyl halide to obtain a propargyl-substituted phenolic resin; and (iii) reacting the propargyl-substituted phenolic resin obtained in Step (ii) with benzyl azide to form a triazole-containing phenolic resin. In Step (ii), a base may be added so that reaction proceeds in a forward direction in a DMF solvent, and in Step (iii), an alkyne of the propargyl-substituted phenolic resin and an azide of benzyl azide may be reacted by a click chemistry reaction.

In an embodiment, the phenolic resin impregnating solution may include 10 to 15 parts by weight of one selected from the group consisting of tetrabromobisphenol A, a triazole-modified phenolic resin, a triazine-modified phenolic resin and a mixture of two or more thereof based on 100 parts by weight of the phenolic resin impregnating solution.

In an embodiment, the melamine resin impregnating solution in Step (c) may further include a UV absorber, and the UV absorber is one selected from the group consisting of a benzotriazole-based UV absorber, a triazine-based UV absorber and a mixture thereof.

In an embodiment, the pattern paper in Step (c) may further include a pigment containing a UV stabilizer, and the UV stabilizer is one selected from the group consisting of a hydroxybenzophenone-based compound, a hindered amine-based compound, a salicylate-based compound, an oxanilide-based compound and a mixture of two or more thereof.

In an embodiment, the core impregnated paper has a resin content (RC) ranging from 90 to 95 wt % and a volatile content (VC) ranging from 2 to 3 wt % in Step (b).

In an embodiment, the shell impregnated paper may have an RC ranging from 55 to 65 wt % and a VC ranging from 5 to 6 wt % in Step (c).

Advantageous Effects

An eco-friendly semi-noncombustible exterior material and a method of manufacturing the same according to an aspect of the present specification include a core part formed by impregnating a paper or fabric substrate with a triazole-modified phenolic resin and a shell part formed by impregnating a paper substrate with a melamine resin, so that improved flame retardancy and non-combustibility can prevent large-scale fire accidents in the event of a fire, and a UV protection effect can be imparted by a UV film to improve discoloration resistance.

The effects of an aspect of the present specification are not limited to the above-mentioned effects, and it should be understood that the effects of the present specification include all effects that could be inferred from the configuration of the invention described in the detailed description of the invention or the appended claims.

DESCRIPTION OF DRAWINGS

FIG. 1 is a schematic view of an eco-friendly semi-noncombustible exterior material according to an embodiment of the present specification.

FIG. 2 is an enlarged view of A of FIG. 1 and schematically illustrates a UV blocking mechanism of a UV film.

MODES OF THE INVENTION

Hereinafter, aspects of the present specification will be described with reference to the accompanying drawings. However, the description of the present specification may be implemented in various different forms, and thus is not limited to the embodiments described herein. In addition, in order to clearly explain an aspect of the present specification in the drawings, portions that are not related to the present invention are omitted, and like reference numerals are used to refer to like elements throughout the specification.

Throughout the specification, it will be understood that when a portion is referred to as being "connected" to another portion, it can be "directly connected to" the other portion, or "indirectly connected to" the other portion with another member interposed therebetween. Also, when a component "includes" an element, it should be understood that the component does not exclude another element but may further include another element, unless otherwise stated.

Hereinafter, embodiments of the present specification will be described in detail with reference to the accompanying drawings.

Eco-Friendly Semi-Noncombustible Exterior Material

FIG. 1 is a schematic view of an eco-friendly semi-noncombustible exterior material according to an embodiment of the present specification.

Referring to FIG. 1, an aspect of the present specification provides an eco-friendly semi-noncombustible exterior material which includes: a core part 10 formed by impregnating a paper or fabric substrate with a triazole-modified phenolic resin; a shell part 20 formed by impregnating a paper- or fabric-laminated substrate with a melamine resin and bonded to at least one surface of the core part 10; and a UV film 30 formed on at least one surface of the shell parts 20 and 20' and containing a polymethyl methacrylate resin.

The eco-friendly semi-noncombustible exterior material may be manufactured by including the core part 10 formed by impregnating a paper or fabric substrate with a triazole-modified phenolic resin. The substrate of the core part 10 may be fiberglass containing an inorganic flame retardant. The inorganic flame retardant may be included in the fiberglass to impart flame retardancy. The inorganic flame retardant may be one selected from the group consisting of calcium carbonate, silicon dioxide, aluminum hydroxide, magnesium oxide, aluminum oxide and a mixture of two or more thereof. In addition, the inorganic flame retardant may have an average particle diameter of 5 to 300 μm. The particle diameter is a median size corresponding to cumulative 50% in particle size analysis. When the particle diameter of the inorganic flame retardant is less than the lower limit, viscosity increases and formability in an impregnation process or the like deteriorates. When the particle diameter of the inorganic flame retardant exceeds the upper limit, bonding strength may be weakened in the subsequent lamination and bonding process.

Meanwhile, the phenolic resin may be a phenolic resin obtained by mixing aldehydes with phenolic resins such as phenol and cresol, allowing a reaction in the presence of a base or acid catalyst, subjecting a reaction product to propargyl substitution, and introducing a triazole group thereinto by a benzyl azide reaction. The triazole-modified phenolic resin formed according to the above-described method can improve flame retardancy compared to general phenolic resins, and does not contain bromine or chlorine, and thus no harmful chemicals are discharged during combustion, improving eco-friendliness and stability.

In addition, in order to increase flame retardancy, the phenolic resin may be prepared by adding one selected from the group consisting of tetrabromobisphenol A, a triazole-modified phenolic resin, a triazine-modified phenolic resin, and a mixture of two or more thereof to the phenolic resin impregnating solution, but the present invention is not limited thereto. In this case, the content of the added component may be in the range of 10 to 15 parts by weight based on 100 parts by weight of the phenolic resin impregnating solution.

The eco-friendly semi-noncombustible exterior material may be manufactured by including shell parts 20 and 20' formed by impregnating a paper substrate with a melamine resin and bonded to at least one surface of the core part 10.

The substrate of the shell parts 20 and 20' may be a paper substrate, for example, pattern paper, and the shell part may be formed by impregnating a pattern paper layer with a melamine resin. The pattern paper is not particularly limited, but is preferably a type that does not deform at a high temperature. For example, cellulosic paper may be used as pattern paper. When the pattern paper is impregnated with a melamine resin, colloidal silica or vitreous frits, a flame retardant and the like may be added to melamine solids in the melamine resin impregnating solution, but the present invention is not limited thereto.

Meanwhile, the shell parts 20 and 20' may be formed on at least one surface of the core part 10. For example, one shell part 20 may be formed on one surface of the core part 10, or two shell parts 20 and 20' may be formed on both surfaces of the core part 10, but the present invention is not limited thereto.

Meanwhile, the melamine resin may further include a UV absorber. The UV absorber absorbs ultraviolet rays incident on the exterior material, converts the ultraviolet rays into thermal energy, and emits the thermal energy, and may be one selected from the group consisting of a benzotriazole-based UV absorber, a triazine-based UV absorber and a mixture thereof, but the present invention is not limited thereto.

In addition, the pattern paper may further include a pigment containing a UV stabilizer. The UV stabilizer can remove polymer radicals generated by absorption of ultraviolet rays on the resin. The UV stabilizer may be one selected from the group consisting of a hydroxybenzophenone-based compound, a hindered amine-based compound, a salicylate-based compound, an oxanilide-based compound, and a mixture of two or more thereof, but the present invention is not limited thereto.

The eco-friendly semi-noncombustible exterior material may be manufactured by including the UV film 30 containing a polymethyl methacrylate (PMMA) resin on at least one surface of the shell part 20.

Common resins such as melamine resins, acrylic resins, phenolic resins and the like absorb ultraviolet rays when exposed to ultraviolet rays to form polymer radicals. The radicals undergo processes such as photo-oxidation and proliferation, and chain bonds are formed by recombination of free radicals, thereby causing loss of gloss, cracks, yellowing, swelling, discoloration and the like in the resin. The eco-friendly semi-noncombustible exterior material can improve the aforementioned problems by including the UV film.

Since the eco-friendly semi-noncombustible exterior material includes the core part 10 containing a phenolic resin and the shell part 20 and 20' containing a melamine resin, yellowing and discoloration occur due to ultraviolet rays when the exterior material is exposed to the external environment for a long time. As a result, weather resistance, durability and aesthetics may deteriorate. However, the eco-friendly semi-noncombustible exterior material according to an aspect of the present specification may block ultraviolet rays by including the UV film 30 containing a PMMA resin, and thus may impart weather resistance, stability, and discoloration resistance.

Specifically, FIG. 2 shows the UV blocking mechanism of the UV film of the eco-friendly semi-noncombustible exterior material according to an embodiment of the present specification.

Referring to FIG. 2, when ultraviolet rays are irradiated to the UV film 30 formed on the outermost portion of the eco-friendly semi-noncombustible exterior material, most of the ultraviolet rays may be blocked by the UV film 30. Only a residual amount of ultraviolet rays is absorbed by the shell parts 20 and 20', so the amount of ultraviolet rays absorbed may be remarkably reduced, and accordingly, discoloration of the exterior material is delayed, resulting in an increase in discoloration resistance and weather resistance.

As a non-limiting example of the present specification, when the shell parts 20 and 20' are shell parts 20 and 20' in which pattern paper formed by a pigment containing a UV stabilizer, a melamine resin further containing a UV absorber, or both, is used, it is possible to effectively remove the residual amount of ultraviolet rays absorbed, so that discoloration resistance and weather resistance can be remarkably improved, but the present invention is not limited thereto.

Meanwhile, the thickness of the exterior material may be in the range of 8T to for example, may be 8T, 8.5T, 9T, 9.5T or 10T. When the thickness of the exterior material is less than 8T, weather resistance and discoloration resistance may be reduced, and when the thickness of the exterior material exceeds 10T, durability and aesthetics may deteriorate because the exterior material becomes unnecessarily thick. Here, 1T may refer to 1 mm.

Method of Manufacturing Eco-Friendly Semi-Noncombustible Exterior Material

Another aspect of the present specification provides a method of manufacturing an eco-friendly semi-noncombustible exterior material which includes: (a) preparing a phenolic resin impregnating solution and a melamine resin impregnating solution by introducing a phenolic resin and a melamine resin into respective impregnation tanks; (b) preparing core impregnated paper by impregnating a paper or fabric substrate with the phenolic resin impregnating solution; (c) preparing shell impregnated paper by impregnating a paper substrate with the melamine resin impregnating solution; (d) forming a core part 10 by laminating one or more sheets of the core impregnated paper; (e) forming shell parts 20 and 20' by laminating one or more sheets of the shell impregnated paper, and bonding the shell parts 20 and 20' to at least one surface of the core part; and (0 forming a UV film 30 containing a PMMA resin on at least one surface of the shell parts 20 and 20'.

In the method of manufacturing an eco-friendly semi-noncombustible exterior material of the present specification, a phenolic resin impregnating solution and a melamine resin impregnating solution may be prepared by introducing a phenolic resin and a melamine resin into respective impregnation tanks in Step (a). In an example, each of the impregnation tanks in Step (a) may be filled with an inorganic flame retardant.

The phenolic resin may be reacted in the presence of a base or acid catalyst as described above, but an acid catalyst is more preferred. Specifically, the phenolic resin in Step (a) may be prepared by a method including: (i) synthesizing a phenolic resin in the presence of an acid catalyst; (ii) reacting the phenolic resin synthesized in Step (i) with propargyl halide to obtain a propargyl-substituted phenolic resin; and (iii) reacting the propargyl-substituted phenolic resin obtained in Step (ii) with benzyl azide to form a triazole-containing phenolic resin. A base may be added so that reaction proceeds in a forward direction in a DMF solvent in Step (ii), and an alkyne of the propargyl-substituted phenolic resin and an azide of benzyl azide may be reacted by a click chemistry reaction in Step (iii).

More specifically, in Step (i), a 37% formaldehyde aqueous solution and phenol undergo polymerization in a molar ratio of 1:0.66 in the presence of an acid catalyst, for example, 1M hydrochloric acid, at 42° C. to 55° C., for example at 50° C., and then the mixture is stirred at 90° C. to 100° C., for example, at 95° C. for 85 to 95 minutes, for example, for 90 minutes. After unreacted phenol, formaldehyde, and a catalyst in the stirred mixture are removed using distilled water at 90° C., the distilled water is removed by rotary evaporation. When the rotary evaporation is completed, a light yellow transparent phenolic resin, for example, a novolak is obtained.

In Step (ii), the phenolic resin is stirred and dissolved in a solvent at room temperature of 20° C. to 27° C., for example, about 25° C., and then a salt is added thereto so that the reaction proceeds in the forward direction to form a basic aqueous solution with a pH of 8 to 12, turning purple. As the solvent used at this time, dimethylformamide (DMF), methanol, ethanol, tetrahydrofuran (THF), dimethoxyethane (DME), dimethyl sulfoxide (DMSO), diethyl ether, dichloromethane, chloroform and the like not adversely affecting the reaction are used to perform the reaction, for example, dimethylformamide (DMF) is used, and a metal salt formed using a base may be used as the salt. An alkali metal or alkaline earth metal salt is obtained, for example, by dissolving a compound in an excess alkali metal hydroxide or an alkaline earth metal hydroxide solution, filtering the undissolved compound salt, and then evaporating the filtrate to dryness.

Here, as the metal salt, it is particularly suitable to produce sodium, potassium or calcium, and the corresponding silver salt is obtained by reacting an alkali metal or alkaline earth metal salt with suitable silver. For example, sodium, calcium, and potassium salts of a hydroxyl group are included, and other salts of an amino group include hydrobromide, sulfate, hydrogen sulfate, phosphate, hydrogen phosphate, and dihydrogen phosphate, which may be prepared by a method or process of preparing a salt known in the related field. Propargyl halide, for example, propargyl bromide, is added dropwise to the dissolved solids at intervals of 30 minutes, and then heated to 50° C. to 60° C. for 2 to 4 hours, for example, for 3 hours for reaction. When the reaction is complete, the reactant changes from purple to pale yellow. Potassium bromide is added to the reactant for the purpose of removing the reactant, residual salt is filtered, and excess propargyl bromide is removed under vacuum to obtain a propargyl-substituted phenolic resin.

In Step (iii), the propargyl-substituted phenolic resin synthesized in Step (ii) is stirred with an azide compound such as benzyl azide in the presence of a solvent. A catalyst such as copper iodide is added to promote electron transfer so that the reaction proceeds quickly, and the reaction is performed at room temperature for 24 hours. Accordingly, the alkyne of the propargyl-substituted phenolic resin and the azide of benzyl azide form a triazole-containing phenolic resin through a click chemistry reaction. Here, as the solvent, dimethylformamide (DMF), methanol, ethanol, tetrahydrofuran (THF), dimethoxyethane (DME), dimethyl sulfoxide (DMSO), diethyl ether, dichloromethane and chloroform not adversely affecting the reaction are used, for example, dimethylformamide (DMF) is used. When the reaction is completed, the residue in the reaction product is filtered, and the reaction product is extracted with a solvent and concentrated in vacuo. Here, water is used as the solvent. When the vacuum concentration is completed, a triazole-containing phenolic resin may be obtained.

Meanwhile, organic acids and inorganic acids may be used as the acid catalyst, and hydrochloric acid, phosphoric acid, sulfuric acid, nitric acid, tartaric acid and the like may be used as inorganic acids, and methane sulfonic acid, p-toluene sulfonic acid, acetic acid, trifluoroacetic acid, citric acid, maleic acid, succinic acid, oxalic acid, benzoic acid, tartaric acid, fumaric acid, mandelic acid, propionic acid, citric acid, lactic acid, glycolic acid, gluconic acid, galacturonic acid, glutamic acid, glutaric acid, glucuronic acid, aspartic acid, ascorbic acid, carbonic acid, vanillic acid, hydroiodic acid, and the like may be used as organic acids.

In an example, in Step (b), a fiberglass substrate may be impregnated with the phenolic resin impregnating solution to prepare core impregnated paper, and in Step (c), the pattern paper may be impregnated with the melamine resin impregnating solution to prepare shell impregnated paper. In Steps (b) and (c), air inside the paper may be removed and the resin may be sufficiently penetrated into the substrate by repeatedly carrying out the process of impregnation of the substrates in respective impregnating solutions and taking out the impregnated substrates from the respective impregnating solutions.

Meanwhile, the melamine resin impregnating solution may include 10 to 15 parts by weight of one selected from the group consisting of tetrabromobisphenol A, a triazole-modified phenolic resin, a triazine-modified phenolic resin and a mixture of two or more thereof based on 100 parts by weight of the melamine resin impregnating solution. For example, 10 parts by weight, 11 parts by weight, 12 parts by weight, 13 parts by weight, 14 parts by weight or 15 parts by weight of one selected from the group consisting of tetrabromobisphenol A, a triazole-modified phenolic resin, a triazine-modified phenolic resin, and a mixture of two or more thereof may be added based on 100 parts by weight of the melamine resin impregnating solution, but the present invention is not limited thereto. When the addition amount is less than 10 parts by weight, flame retardancy may be lowered, and when the addition amount is more than 15 parts by weight, durability may deteriorate due to excessive addition.

Meanwhile, the phenolic resin impregnating solution in Step (b) may further include a UV absorber. The UV absorber may be one selected from the group consisting of a benzotriazole-based UV absorber, a triazine-based UV absorber, and a mixture thereof. In addition, the pattern paper in Step (c) further includes a pigment containing a UV stabilizer, and the UV stabilizer may be one selected from the group consisting of a hydroxybenzophenone-based compound, a hindered amine-based compound, a salicylate-based compound, an oxanilide-based compound, and a mixture of two or more thereof.

The UV absorber and UV stabilizer can improve anti-yellowing performance and discoloration resistance of the exterior material by converting the ultraviolet rays that are not blocked by the UV film 30 into thermal energy and removing radicals, thereby significantly increasing the weather resistance and lifespan of the exterior material.

Meanwhile, the core impregnated paper may have a resin content (RC) ranging from 90 to 95 wt % and a volatile content (VC) ranging from 2 to 3 wt % in Step (b).

The term "RC" used in the present invention is the amount of resin applied, and "VC" refers to the amount of volatile matter remaining after drying, which is a factor that affects the quality of the exterior material.

When the RC and VC of the core impregnated paper are above or below the above-described range, peeling between layers may occur and durability may deteriorate, thereby reducing the quality of the exterior material.

In Step (c), the shell impregnated paper may have an RC ranging from 55 to 65 wt % and a VC ranging from 5 to 6 wt %. When the RC and VC of the pattern paper are above or below the above-described range, peeling between layers may occur and durability may deteriorate, thereby reducing the quality of the exterior material.

Furthermore, in Steps (b) and (c), a drying process may be performed at 10 to 15 m/min and 130° C. to 140° C., but the present invention is not limited thereto. After the drying, the non-volatile component impregnated into the core impregnated paper and the shell impregnated paper and remaining therein may act as an adhesive in the step of combining to form an exterior material, which will be described below.

In Step (d), the core part 10 may be formed by laminating one or more sheets of the core impregnated paper, and in Step (e), the shell parts 20 and 20' may be formed by laminating one or more sheets of the shell impregnated paper, and the shell parts 20 and 20' may be bonded to at least one surface of the core part 10. In Steps (d) and (e), the core impregnated paper and the shell impregnated paper may be manufactured in combination according to the thickness to be implemented, for example, 2 sheets, 3 sheets, 4 sheets, 5 sheets, 6 sheets, 7 sheets, 8 sheets, 9 sheets or 10 sheets or more may be combined, but the present invention is not limited thereto.

In Step (f), an eco-friendly semi-noncombustible exterior material may be manufactured by forming the UV film 30 containing a PMMA resin on at least one surface of the shell parts 20 and 20'. The UV film 30 containing the PMMA resin may impart weather resistance and discoloration resistance to the exterior material by blocking ultraviolet rays. The UV blocking mechanism of the UV film 30, the thickness of the UV film and the effects thereof are as described above.

Hereinafter, an embodiment of the present specification will be described in detail.

EXAMPLE 1

37% formaldehyde and phenol were reacted in a molar ratio of 1:0.66 at 50° C. in the presence of 1M hydrochloric acid, and the mixture was stirred at 95° C. for 90 minutes. After the stirring was completed, unreacted phenol, formaldehyde and the catalyst were washed and removed using distilled water at 90° C. to obtain a phenolic resin. 5 g of sodium hydroxide was added in the presence of dimethylformamide (DMF), and 15 g of propargyl bromide was added dropwise to the phenolic resin every 30 minutes, followed by reaction at 65° C. for 3 hours, and potassium bromide was added to the reaction product so that residual salt was filtered off, and an excess amount of propargyl bromide was removed under vacuum to obtain a propargyl-substituted phenolic resin. 5 g of benzyl azide and 250 mg of copper iodide were added in the presence of dimethylformamide (DMF), reacted with the propargyl-substituted phenolic resin at room temperature for 24 hours, and then the remaining copper iodide and sodium bromide in a reaction product were filtered, and the reaction product was extracted by a solvent and subjected to vacuum concentration to obtain a triazole-containing phenolic resin.

The triazole-containing phenolic resin thus prepared was mixed with aluminum oxide in a weight ratio of 1:1, and a fiberglass nonwoven fabric was impregnated so that an RC was 90 wt % and a VC was 2.5 wt %, and then dried at 135° C. to prepare fiberglass impregnated fabric.

Pattern paper was impregnated in the impregnating solution so that an RC was 60 wt % and a VC was 5.5 wt % based on 100 parts by weight of the melamine resin impregnating solution, and then dried at 135° C. to prepare pattern paper impregnated paper.

sheets of the prepared fiberglass impregnated paper were combined and laminated, and heated and pressed with a molding machine at 150° C. and 60 kgf/cm$^2$ for 40 minutes to prepare a core part. Further, two bundles of 10 sheets of the prepared pattern paper impregnated paper were combined and laminated, and heated and pressed with a molding machine at 150° C. and 60 kgf/cm$^2$ for 40 minutes to prepare two shell parts.

A PMMA UV film primed for melamine was prepared.

The pattern paper impregnated paper, fiberglass impregnated paper, pattern paper impregnated paper and PMMA UV film were sequentially laminated, heated and pressed at 150° C. and 60 kgf/cm$^2$ for 40 minutes to prepare an exterior material.

EXAMPLE 2

An exterior material was prepared in the same manner as in Example 1, except that pattern paper was impregnated in the impregnating solution to which 10 parts by weight of tetrabromobisphenol A was added to 100 parts by weight of the phenolic resin impregnating solution so that an RC was 90 wt % and a VC was 2.5 wt %, and then dried at 135° C. to prepare fiberglass impregnated paper.

Comparative Example 1

37% formaldehyde and phenol were reacted in a molar ratio of 1:0.66 at 50° C. in the presence of 1M hydrochloric acid, and the mixture was stirred at 95° C. for 90 minutes. After the stirring was completed, unreacted phenol, formaldehyde and the catalyst were washed and removed using distilled water at 90° C. to obtain a phenolic resin.

The phenolic resin thus prepared was mixed with aluminum oxide in a weight ratio of 1:1, and a fiberglass nonwoven fabric was impregnated so that an RC was 90 wt % and a VC was 2.5 wt %, and then dried at 135° C. to prepare fiberglass impregnated fabric.

Pattern paper was impregnated in the impregnating solution so that an RC was 60 wt % and a VC was 5.5 wt % based on 100 parts by weight of the melamine resin impregnating solution, and then dried at 135° C. to prepare pattern paper impregnated paper.

20 sheets of the prepared fiberglass impregnated paper were combined and laminated, and heated and pressed with a molding machine at 150° C. and 60 kgf/cm² for 40 minutes to prepare a core part. Further, two bundles of 10 sheets of the pattern paper impregnated paper prepared above were combined and laminated, and heated and pressed with a molding machine at 150° C. and 60 kgf/cm² for 40 minutes to prepare two shell parts.

The pattern paper impregnated paper, fiberglass impregnated paper, pattern paper impregnated paper and a PMMA UV film were sequentially laminated, heated and pressed at 150° C. and 60 kgf/cm² for 40 minutes to prepare an exterior material.

Comparative Example 2

An exterior material was prepared in the same manner as in Comparative Example 1, except that the PMMA UV film was formed on the pattern paper impregnated paper.

Comparative Example 3

An exterior material was prepared in the same manner as in Comparative Example 1, except that the core part was prepared by including a triazole-modified phenolic resin.

Comparative Example 4

An exterior material was prepared in the same manner as in Comparative Example 3, except that a polyurethane acrylate UV film was formed on the pattern paper impregnated paper.

Experimental Example 1: Evaluation of Anti-Yellowing Performance

An accelerated weather resistance test was conducted to evaluate the anti-yellowing performance of the eco-friendly semi-noncombustible exterior material according to an embodiment of the present invention. The experiment was carried out in accordance with KS F 2274:2018 and KS A 0063:2015, and the exterior material sheets prepared according to Examples and Comparative Examples were made into samples with a size of 4 cm×4 cm, and then exposed to a xenon-arc lamp for 3,000 hours. After 3,000 hours, the chromaticity before and after the lamp irradiation was measured to obtain the color difference value, which is the degree of color change, and the results are shown in Table 1.

TABLE 1

| Classification | Color difference ($\Delta E^*ab$) |
| --- | --- |
| Example 1 | 0.7 |
| Example 2 | 0.8 |
| Comparative Example 1 | 4.6 |
| Comparative Example 2 | 3.7 |
| Comparative Example 3 | 4.0 |
| Comparative Example 4 | 3.8 |

Referring to Table 1, it can be seen that the exterior materials of Examples 1 and 2 have color difference values of 0.7 and 0.8, and almost no yellowing occurred, indicating excellent weather resistance and discoloration resistance. In detail, since the core part is prepared by including a triazole-modified phenolic resin and the exterior material is prepared by including a PMMA UV film, yellowing can be suppressed, and thus weather resistance and discoloration resistance can be effectively improved. On the other hand, in the case of Comparative Example 1, which includes an existing phenolic resin produced through the reaction between phenol and formaldehyde and is prepared without a UV film, ultraviolet rays are irradiated and absorbed into the shell part located on the outermost surface of the exterior material without the ultraviolet rays being blocked, and thus a melamine resin reacts with ultraviolet rays to cause yellowing, resulting in the highest color difference value of 4.6 after 3,000 hours, indicating poor weather resistance and discoloration resistance. In addition, in the case of Comparative Example 2 in which a PMMA film was added to Comparative Example 1, some ultraviolet rays were blocked by the UV film, and thus a color difference value lower than that of Comparative Example 1 was shown due to the remaining amount of ultraviolet rays, but it was confirmed that yellowing occurred. It can be seen that yellowing occurred even in Comparative Example 3 without the UV film, and in the case of Comparative Example 4 including the polyurethane acrylate UV film, although some ultraviolet rays were blocked, the blocking power was lowered compared to the PMMA UV film.

Experimental Example 2: Evaluation of Non-Combustible Performance

A heat release test and a gas toxicity test were conducted in order to evaluate the non-combustible performance of the eco-friendly semi-noncombustible exterior material according to an embodiment of the present invention.

The tests were conducted according to KS F ISO 5660-1:2015 and KS F 2271:2016, respectively, and the exterior material sheets prepared according to Examples and Comparative Examples were made into samples having a size of 30 cm×30 cm.

In the heat release test, the total amount of heat released for 10 minutes after the start of heating the sample and the maximum heat release rate sustained for 10 seconds or more during the 10 minutes were measured, and the results are shown in Table 2.

The gas toxicity test measures the average behavior stop time (min) of test white mice when the test white mice are exposed to combustion gas. A test box of 220 mm×220 mm was prepared, eight rotating baskets, each containing a single test white mouse (ICR strain female, 5 weeks old, 18 to 22 g), were put into the test box, and an exhaust port was opened for 6 minutes of heating time. After that, the exhaust port was blocked to prevent gas in the test box from being discharged, and the time until each test white mouse stopped behaving for 15 minutes after the start of heating was measured and the average value thereof was calculated. The test was conducted on a total of two groups, and the results are shown in Table 2.

TABLE 2

| | | Classification | | | | | |
|---|---|---|---|---|---|---|---|
| | | Example 1 | Example 2 | Comparative Example 1 | Comparative Example 2 | Comparative Example 3 | Comparative Example 4 |
| Heat release test | Total heat release (MJ/m$^2$) | 2.3 | 2.6 | 8.7 | 8.8 | 3.4 | 3.6 |
| | Time (sec) during which heat release rate continuously exceeds 200 kW/m$^2$ | 0 | 0 | 3 | 2 | 0 | 0 |
| | Cracks, holes and melting which are harmful for fire protection and penetrate samples | None | None | Observed | Observed | None | None |
| Gas toxicity test | Average behavior stop time (min) | 10:04 | 9:49 | 7:27 | 7:48 | 9:21 | 9:11 |

Standards for Semi-Noncombustible Materials (Article 2 of the Enforcement Decree of the Building Act)
  Total heat release: the total heat of 8 MJ/m 2 or less released for 10 minutes after the start of the heating test satisfies the semi-noncombustible material standard.
  Maximum heat release rate lasting more than 10 seconds: the maximum heat release rate for 10 minutes after the start of the heating test does not exceed 200 kW/m$^2$ continuously for more than 10 seconds
  After heating, there should be no cracks, holes and melting that are harmful for fire protection and penetrate the sample, and the core material is not completely melted or destroyed in the case of composite materials.
Gas Toxicity Test
  Average behavior stop time (min): test was conducted on two groups and it was evaluated as "pass" when the average behavior stop time is 9 minutes or more.
  Referring to Table 2, it is confirmed that the exterior materials of Examples 1 and 2 satisfy the standards for semi-noncombustible materials according to the Enforcement Decree of the Building Act by passing all the evaluation criteria of the heat release test, and pass the gas toxicity test standard, showing excellent stability. When the eco-friendly semi-noncombustible exterior material of the present invention is applied to buildings, it can be predicted that flame retardancy and non-combustibility are excellent, and weather resistance is also remarkable due to discoloration resistance effects.
  On the other hand, Comparative Examples 1 and 2 containing existing phenolic resins show poor incombustibility and flame retardancy, failing to meet the standards in both the heat release test and the gas toxicity test. It can be seen that Comparative Examples 3 and 4 containing the triazole-modified phenolic resin satisfy the semi-noncombustible test standard, but do not include a UV film or include a polyurethane acrylate film instead of the UV film, resulting in yellowing and poor weather resistance, and thus have significantly lowered physical properties compared to those of the eco-friendly semi-noncombustible exterior material of the present invention.

While this specification includes specific examples, it will be apparent to those of ordinary skill to which this specification pertains that various changes in form and details may be made in these examples without departing from the spirit and scope of the claims and their equivalents. Therefore, the examples described herein are to be considered in a descriptive sense only, and not for purposes of limitation. For example, each component described as a single type may be implemented to be distributed and similarly, components described to be distributed may also be implemented in a combined form.

The scope of the specification is defined not by the detailed description, but by the claims and their equivalents, and all variations within the scope of the claims and their equivalents are to be construed as being included in the specification.

DESCRIPTION OF NUMERALS

10: CORE PART
20: SHELL PART
20': SHELL PART
30: UV FILM

The invention claimed is:
1. An eco-friendly semi-noncombustible exterior material, comprising:
  a core part (10) formed by impregnating a fiberglass substrate containing an inorganic flame retardant with a triazole-modified phenolic resin;
  a shell part (20) formed by impregnating a paper substrate with a melamine resin and bonded to at least one surface of the core part; and a UV film (30) formed on at least one surface of the shell part and containing a polymethyl methacrylate resin.

2. The eco-friendly semi-noncombustible exterior material according to claim 1, wherein the inorganic flame retardant is one selected from the group consisting of calcium carbonate, silicon dioxide, aluminum hydroxide, magnesium oxide, aluminum oxide and a mixture of two or more thereof.

3. The eco-friendly semi-noncombustible exterior material according to claim 1, wherein the melamine resin further includes a UV absorber, the UV absorber is one selected from the group consisting of a benzotriazole-based UV absorber, a triazine-based UV absorber and a mixture thereof.

4. The eco-friendly semi-noncombustible exterior material according to claim 1, wherein the substrate of the shell part further includes a pigment containing a UV stabilizer, and the UV stabilizer is one selected from the group consisting of a hydroxybenzophenone-based compound, a hindered amine-based compound, a salicylate-based compound, an oxanilide-based compound and a mixture of two or more thereof.

5. The eco-friendly semi-noncombustible exterior material according to claim 1, wherein the exterior material has a thickness ranging from 8 mm to 10 mm.

\* \* \* \* \*